United States Patent
Alpert et al.

(10) Patent No.: US 9,674,543 B2
(45) Date of Patent: Jun. 6, 2017

(54) METHOD FOR SELECTING A MATCHING BLOCK

(71) Applicant: SAMSUNG ELECTRONICS CO., LTD., Suwon-si, Gyeonggi-Do (KR)

(72) Inventors: Sharon Alpert, Ramat Gan (IL); Dan Gluck, Ramat Gan (IL); Omri Govrin, Ramat Gan (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 821 days.

(21) Appl. No.: 14/080,049

(22) Filed: Nov. 14, 2013

(65) Prior Publication Data

US 2014/0133569 A1 May 15, 2014

Related U.S. Application Data

(60) Provisional application No. 61/726,356, filed on Nov. 14, 2012.

(30) Foreign Application Priority Data

Mar. 25, 2013 (KR) .................. 10-2013-0031756

(51) Int. Cl.
H04N 19/51 (2014.01)
(52) U.S. Cl.
CPC .................................. *H04N 19/51* (2014.11)
(58) Field of Classification Search
CPC ..................................................... H04N 19/51
(Continued)

(56) References Cited

U.S. PATENT DOCUMENTS 6,295,377 B1  9/2001 Dufaux et al.
7,346,109 B2  3/2008 Nair et al.
(Continued)

FOREIGN PATENT DOCUMENTS

KR   10-0544686     1/2006
KR   10-2011-0091381  8/2011
(Continued)

OTHER PUBLICATIONS

English Abstract for Publication No. 10-2005-0107172 (for 10-0544686).

(Continued)

*Primary Examiner* — William C Vaughn, Jr.
*Assistant Examiner* — Jerry Jean Baptiste
(74) *Attorney, Agent, or Firm* — F. Chau & Associates, LLC

(57) ABSTRACT

A method for selecting a motion vector includes selecting a candidate block included in a second image that corresponds to a processing block of a first image, computing a first probability for the processing block and the candidate block, selecting a random block for the candidate block, computing a second probability for the processing block and the random block, saving a greater of the first probability and the second probability as a first comparison result, computing a third probability for the processing block, a first neighboring block of the processing block, a matching block in the second image that is matched to the first neighboring block, and a second neighboring block of the matching block, and saving a greater of the first comparison result and the third probability as a second comparison result.

20 Claims, 22 Drawing Sheets

(58) Field of Classification Search
USPC .......................................................... 375/240
See application file for complete search history.

(56) References Cited

U.S. PATENT DOCUMENTS

| | | | |
|---|---|---|---|
| 7,382,897 B2 | 6/2008 | Brown et al. | |
| 7,570,815 B2 | 8/2009 | Stentiford | |
| 7,639,835 B2 | 12/2009 | Hayashi | |
| 2007/0217511 A1* | 9/2007 | Li | H04N 19/56 |
| | | | 375/240.16 |
| 2010/0208814 A1* | 8/2010 | Xiong | H04N 19/70 |
| | | | 375/240.13 |
| 2011/0075935 A1 | 3/2011 | Baqai et al. | |
| 2011/0286520 A1 | 11/2011 | Xu et al. | |
| 2012/0086850 A1 | 4/2012 | Irani et al. | |

FOREIGN PATENT DOCUMENTS

| | | |
|---|---|---|
| KR | 10-2011-0091991 | 8/2011 |
| KR | 10-2012-0030102 | 3/2012 |

OTHER PUBLICATIONS

English Abstract for Publication No. 10-2012-0030102.
English Abstract for Publication No. 10-2011-0091991.
English Abstract for Publication No. 10-2011-0091381.

\* cited by examiner

METHOD FOR SELECTING A MATCHING BLOCK

CROSS-REFERENCE TO RELATED APPLICATIONS

This application claims priority from U.S. provisional patent application No. 61/726,356 filed on Nov. 14, 2012 in the United States Patent and Trademark Office, and under 35 U.S.C. §119 (a) from Korean Patent Application No. 10-2013-0031756 filed on Mar. 25, 2013 in the Korean Intellectual Property Office, and all the benefits accruing therefrom, the contents of all of which are herein incorporated by reference in their entireties.

BACKGROUND

Technical Field

Embodiments of the present inventive concept are directed to a method for selecting a matching block, and more particularly, to a method and a device capable of searching for correspondence between corresponding image blocks.

Discussion of the Related Art

In many computer vision/image processing applications, a typical task is searching for or finding correspondences between image patches. Such a task is common in video compression, motion estimation and image de-noising.

Two factors contribute to complexity in searching for or finding correspondences between image patches. One is that there is a large number of patch comparisons, and the other is that a significant amount of pixel data needs to be transferred.

For example, about 1 mega bit of data are needed to compare 1000 pairs of 8×8 patches. A typical image may include millions of image patches, based on the resolution and the application, and an actual data transfer rate is substantial. Accordingly, in many actual applications, such an operation can cause performance and bandwidth footprint bottlenecks.

SUMMARY

Exemplary embodiments of the present inventive concepts are directed to a method for selecting a matching block, including selecting a candidate block included in a second image that corresponds to a processing block of a first image; computing a first probability for the processing block and the candidate block; selecting a random block for the candidate block, computing a second probability for the processing block and the random block; saving a greater of the first probability and the second probability as a first comparison result, computing a third probability for the processing block, a first neighboring block of the processing block, a matching block n the second image that is matched to the first neighboring block, and a second neighboring block of the matching block; and saving a greater of the first comparison result and the third probability as a second comparison result.

Exemplary embodiments of the present inventive concepts are directed to a method for selecting a matching block, including selecting a candidate block included in a second image that corresponds to a processing block of a first image; computing a first probability for the processing block and the candidate block, selecting a random block for the candidate block; computing a second probability for the processing block and the random block; saving a greater of the first probability and the second probability as a first comparison result, computing a third probability for the processing block, the candidate block, and the random block; saving a greater of the first comparison result and the third probability as a second comparison result; computing a fourth probability for the processing block, a first neighboring block of the processing block; a matching block in the second image that is matched to the first neighboring block, and a second neighboring block of the matching block; and saving a greater of the second comparison result and the fourth probability as a third comparison result. The resulting methods use very small data volumes (codes) for matching and calculating Hamming distances, thus reducing the amount of bandwidth consumption and the hardware gate count.

Exemplary embodiments of the present inventive concepts are directed to a method for selecting a matching block, including selecting a candidate block included in a second image that corresponds to a processing block of a first image; computing a first probability for the processing block and the candidate block; selecting a random block for the candidate block; and computing a second probability for the processing block and the random block; and saving a greater of the first probability and the second probability as a first comparison result. The first probability is $P(T|d_1)$ and the second probability is $P(T|d_2)$, wherein P represents a probability, T represents a true match, $d1$ represents a first hamming distance computed using a first descriptor of the processing block and a second descriptor of the candidate block, and $d2$ represents a second hamming distance computed from the first descriptor and a third descriptor of the random block.

DETAILED DESCRIPTION OF EXEMPLARY EMBODIMENTS

Figure 1:
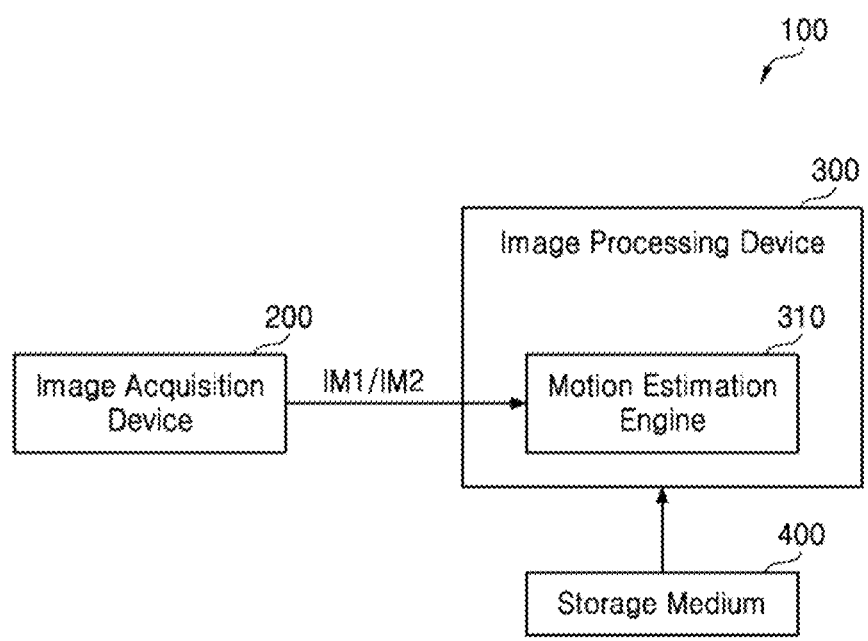
FIG. 1 is a block diagram of an image processing system according to an exemplary embodiment of the present inventive concepts.

FIG. 1 is a block diagram of an image processing system 100 according to an exemplary embodiment of the present inventive concepts. Referring to FIG. 1, an image processing system 100 includes an image acquisition device 200, an image processing device 300 and storage medium 400.

The image processing system 100 may be embodied in a personal computer (PC), or a portable electronic device. The portable electronic device may be embodied in a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, an e-book, etc.

The image acquisition device 200 may supply a plurality of images IM1 and IM2 or frames to the image processing device 300. For example, the image acquisition device 200 may be a memory, an image streaming device or an image pick-up device such as a camera.

The image processing device 300 includes hardware which may process a plurality of images IM1 and IM2, e.g., image de-noising, motion estimation, compression or de-compression. The image processing device 300 may be an encoder and/or a decoder. In addition, the image processing device 300 may be a motion estimation device or a processor.

The image processing device 300 may include a motion estimation engine 310. The motion estimation engine 310 may be hardware which may perform motion estimation, a program code which may perform a specific function and operation, or an electronic recording medium, e.g., a processor, which may perform the program code. For example, the image processing device 300 may be embodied as an image signal processor (ISP) or an application processor performing the image signal processing function.

That is, the motion estimation engine 310 may be a functional or structural combination of hardware that performs the present inventive concept or software for driving the hardware.

The storage medium 400 may store a computer-readable program instruction set which may perform a method for selecting a motion vector according to present inventive concepts. For example, the storage medium 400 may be embodied in a non-volatile memory device such as a read only memory (ROM) or a volatile memory device such as a dynamic random access memory (DRAM) from which stored image data is processed by the motion estimation engine 310.

The program instruction set may be executed by a motion estimation device 310 of the image processing device 300. Accordingly, as the program instruction set is executed, the image processing device 300 may select a motion vector which will be explained in greater detail below.

For convenience of explanation in FIG. 1, the image processing device 300 and the storage medium 400 are illustrated as being divided; however, the storage medium 400 may be embedded inside the image processing device 300 according to an exemplary embodiment.

The program instruction set may be implemented in the motion estimation engine 310.

Figure 2:
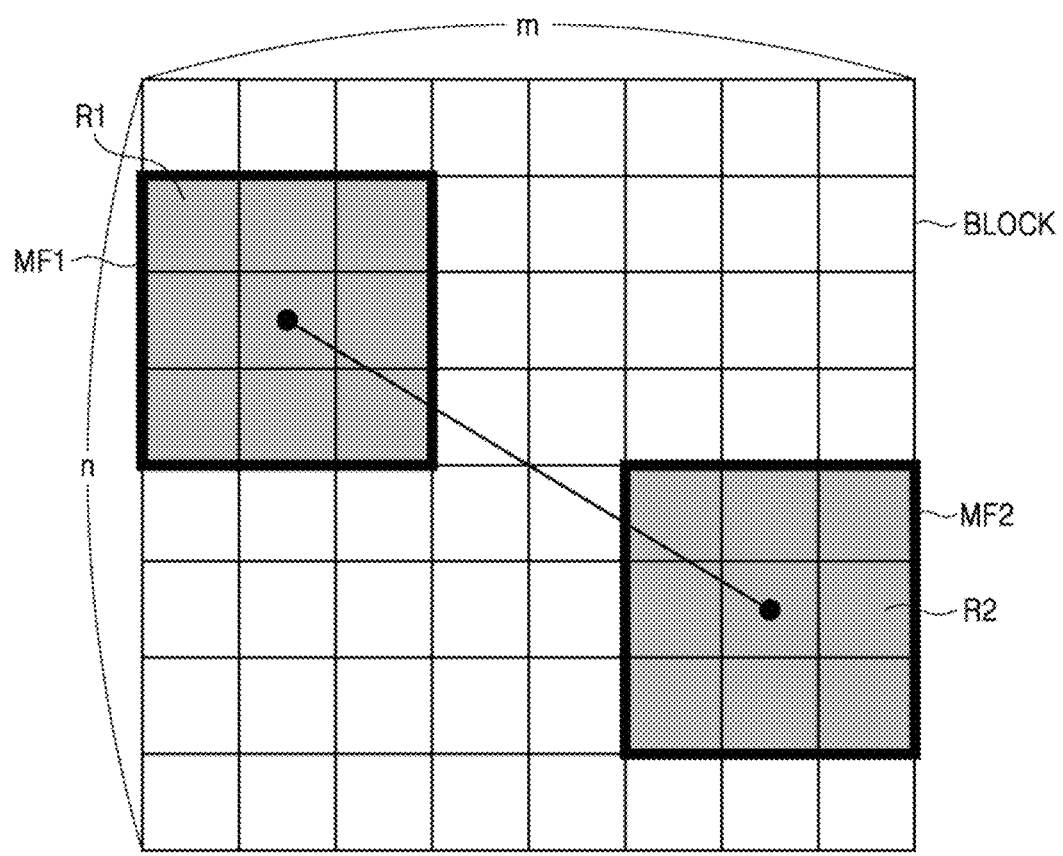
FIG. 2 is a conceptual diagram that illustrates a method for calculating a median pixel value by using median filters

FIG. 2 is a conceptual diagram that illustrates a method of calculating a median pixel value using median filters. Referring to FIGS. 1 and 2, the motion estimation engine 310 divides each of a plurality of images IM1 and IM2 into a plurality of blocks. Each block may be a macro-block or a patch. Each block may include m×n pixels, where m and n are each integers, and m=n or m≠n.

As illustrated in FIG. 2, when one block includes m×n pixels (e.g., m=n=8), Q (where Q is a positive integer) pairs of pixels are selected for ordinal embedding. Here, one or more bits may be used to express each of the Q pairs of pixels. A k×k median filter (k is a positive integer, e.g., k=3) is used for each pixel. In other words, a first median filter MF1 is applied to a first region R1 and a second median filter MF2 is applied to a second region R2.

Figure 3:
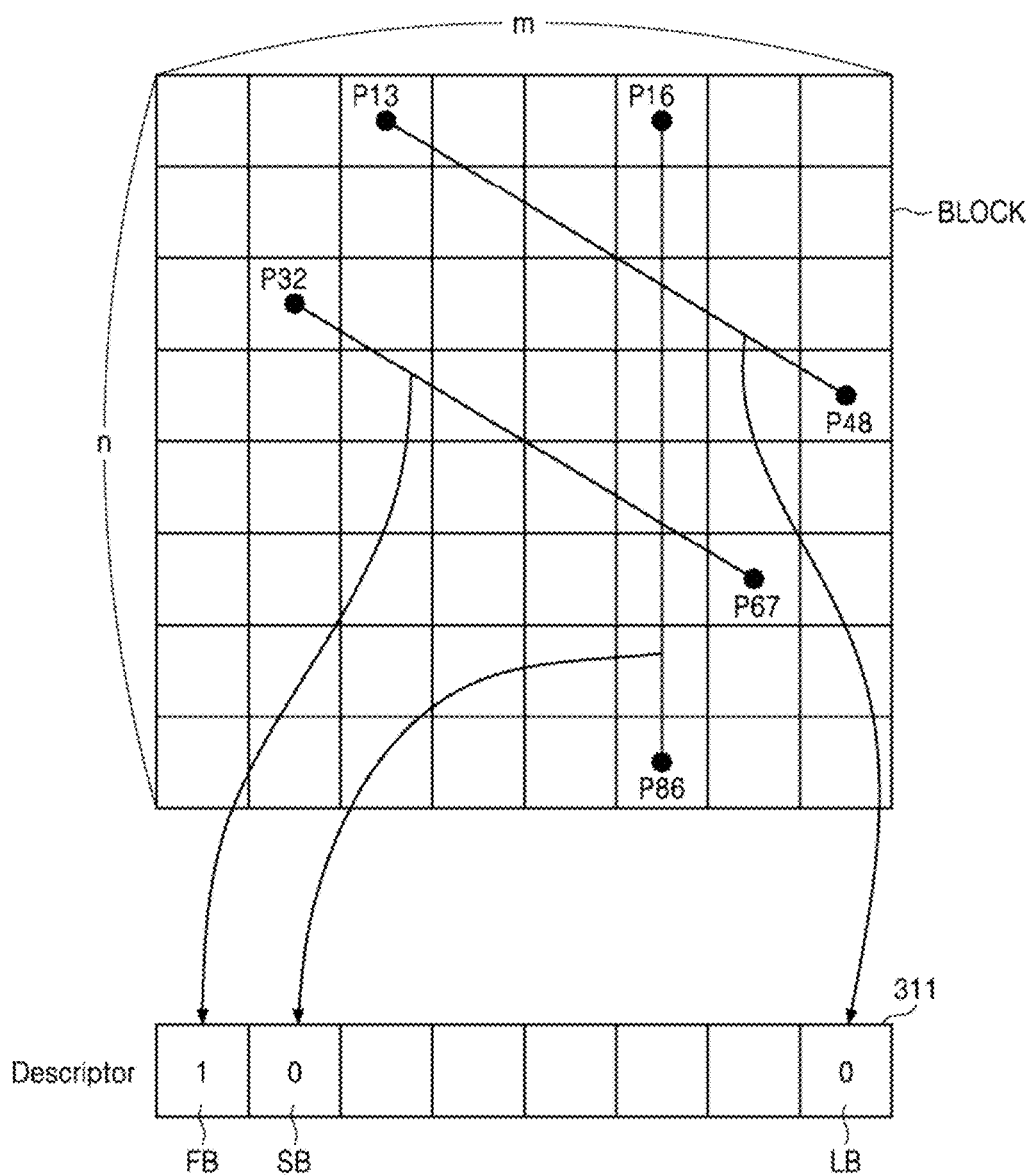
FIG. 3 is a conceptual diagram that illustrates a method for generating a descriptor.

FIG. 3 is a conceptual diagram that illustrates a method of generating a descriptor. Referring to FIGS. 1 through 3, one descriptor 311 is generated for each of a plurality of blocks included in each of the plurality of images IM1 and IM2. For example, the descriptor 311 may be generated using a hash function. As described above, ordinal embedding is used to hash a corresponding block to a value that includes a plurality of bits.

The descriptor 311 includes a plurality of bits, and each bit value is determined based on comparing a pair of corresponding median pixel values generated according to median filtering.

For example, the value of a first bit FB of the descriptor 311 is determined by comparing median pixel values of a pair of pixels P32 and P67. For example, when a median pixel value for a pixel P32 is greater than a median pixel value for a pixel P67, a value of a first bit FB may be set to '1'. The median pixel value may represent brightness, luminance, or chroma.

The value of a second bit SB of the descriptor 311 is determined by comparing median pixel values of a pair of pixels P16 and P86. When a median pixel value for a pixel P16 is less than a median pixel value for a pixel P86, the value of the second bit SB may be set to '0'. The value of last bit LB of the descriptor 311 is determined by comparing median pixel values of a pair of pixels P13 and P48. For example, when a median pixel value for a pixel P13 is less than a median pixel value for a pixel P48, a value of the last bit LB may be set to '0'.

There are various methods for determining a value of each bit included in the descriptor; however, an example of the methods may be expressed by equation 1.

$$f(i, j) = \begin{cases} 1, & med(i) > med(j) \\ 0, & med(i) \le med(j) \end{cases} \quad [\text{Equation 1}]$$

Here, med(i) is a median pixel value of pixel i of pixel pair f(i, j), and med(j) is a median pixel value of pixel j of the pixel pair f(i, j).

Figure 4:
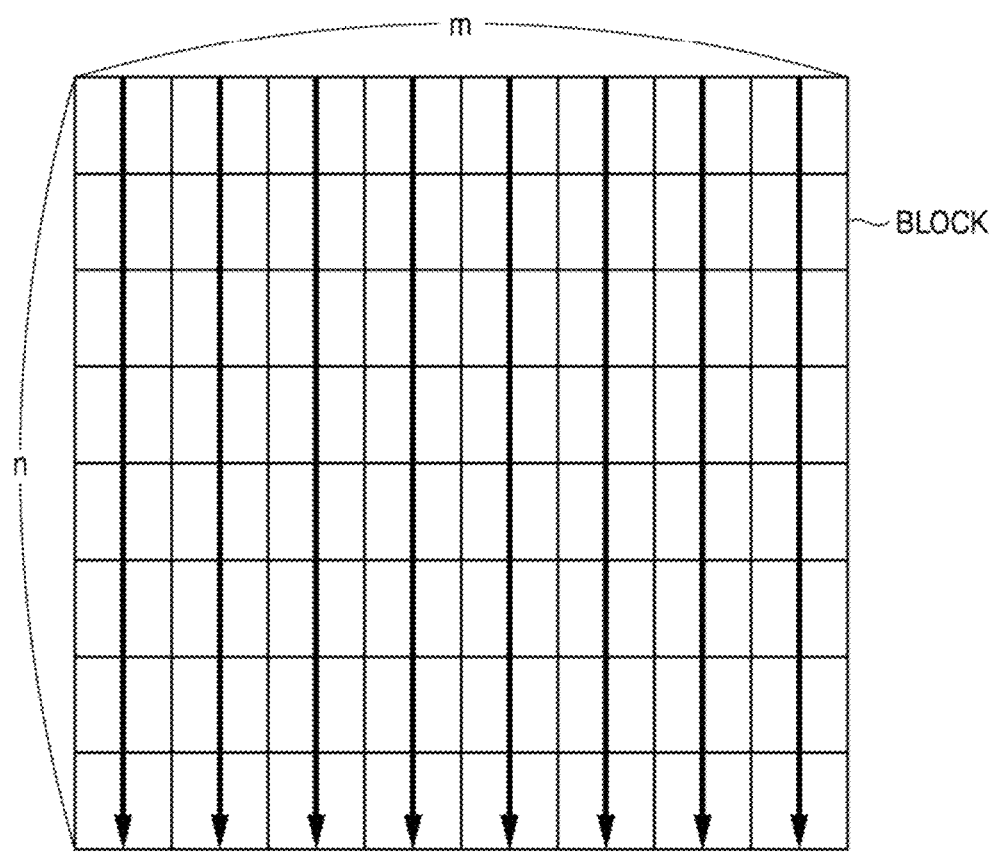
FIGS. 4 to 11 illustrate exemplary embodiments of methods of composing a pixel pair.

FIGS. 4 to 11 illustrate exemplary embodiments of methods for composing a pixel pair. In FIG. 4, a plurality of pixels included in a vertical direction of each column may compose a plurality of pixel pairs. As explained with reference to FIG. 3, when equation 1 is used with each of the plurality of pixel pairs, a descriptor may be formed.

Figure 5:
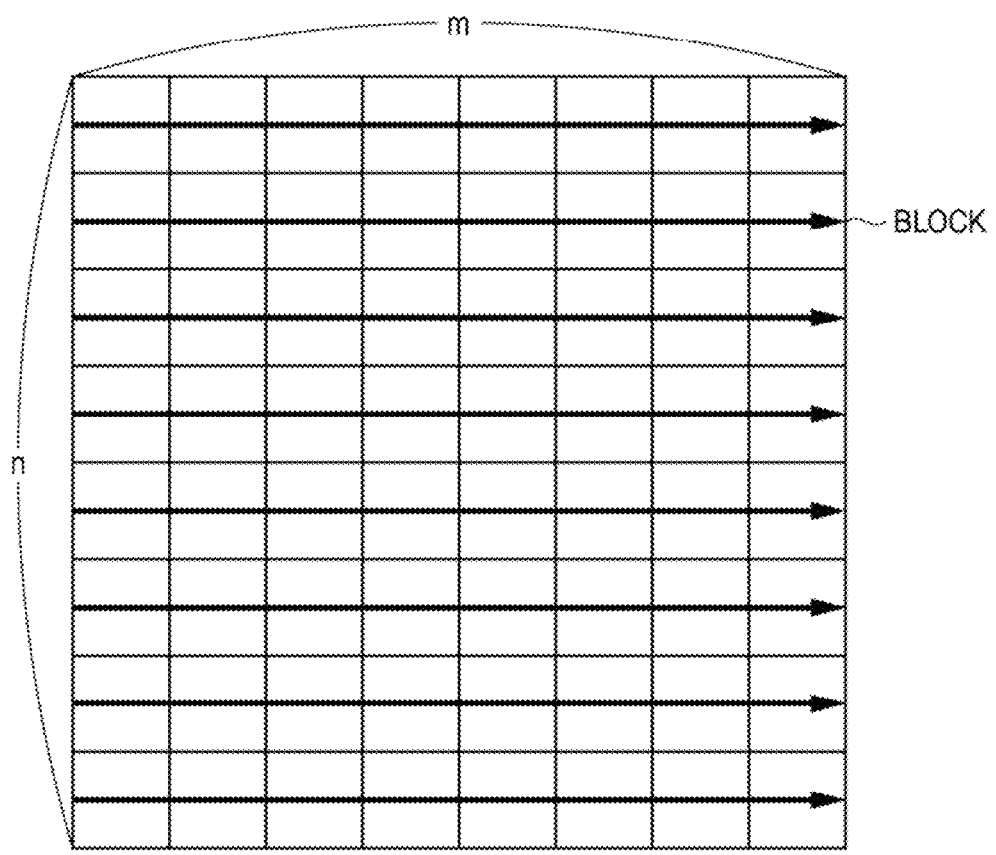
Figure 6:
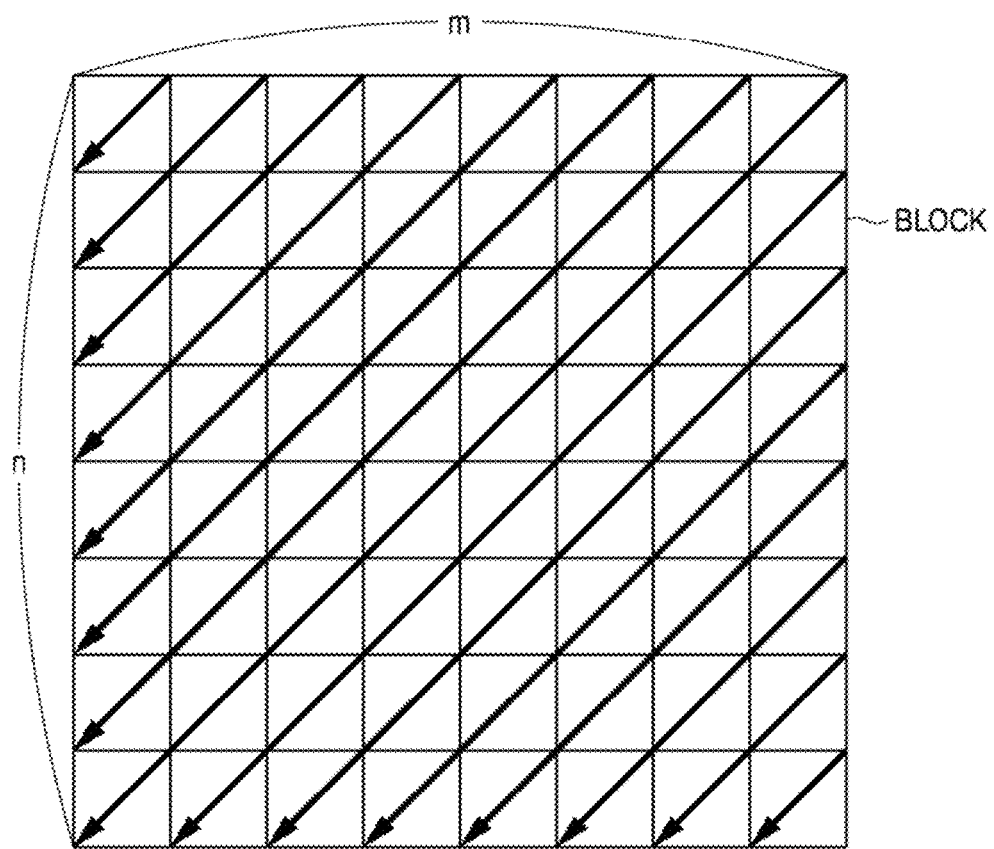

In FIG. 5, a plurality of pixel pairs may be composed using a plurality of pixels included in a horizontal direction of each row. As explained with reference to FIG. 3, when equation 1 is used with each of the plurality of pixel pairs, a descriptor may be formed. In FIG. 6, a plurality of pixel pairs may be composed using a plurality of pixels included in each diagonal down-left direction. As explained with reference to FIG. 3, when equation 1 is used with each of the plurality of pixel pairs, a descriptor may be formed.

Figure 7:
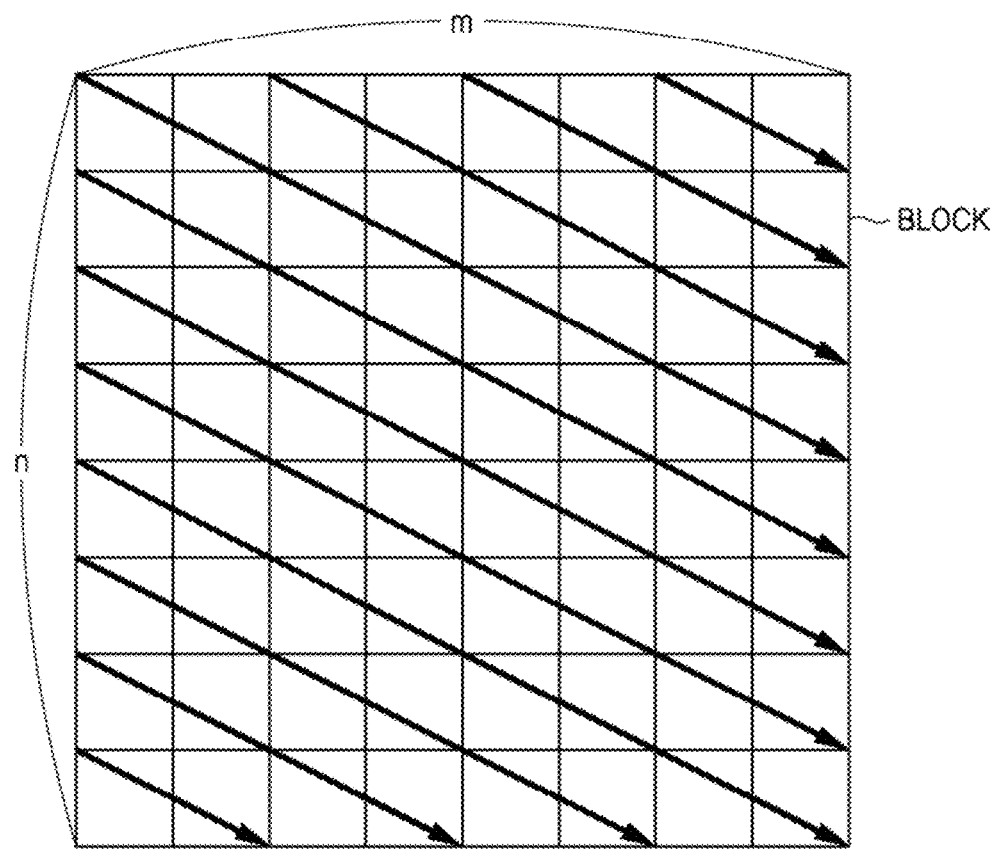
Figure 8:
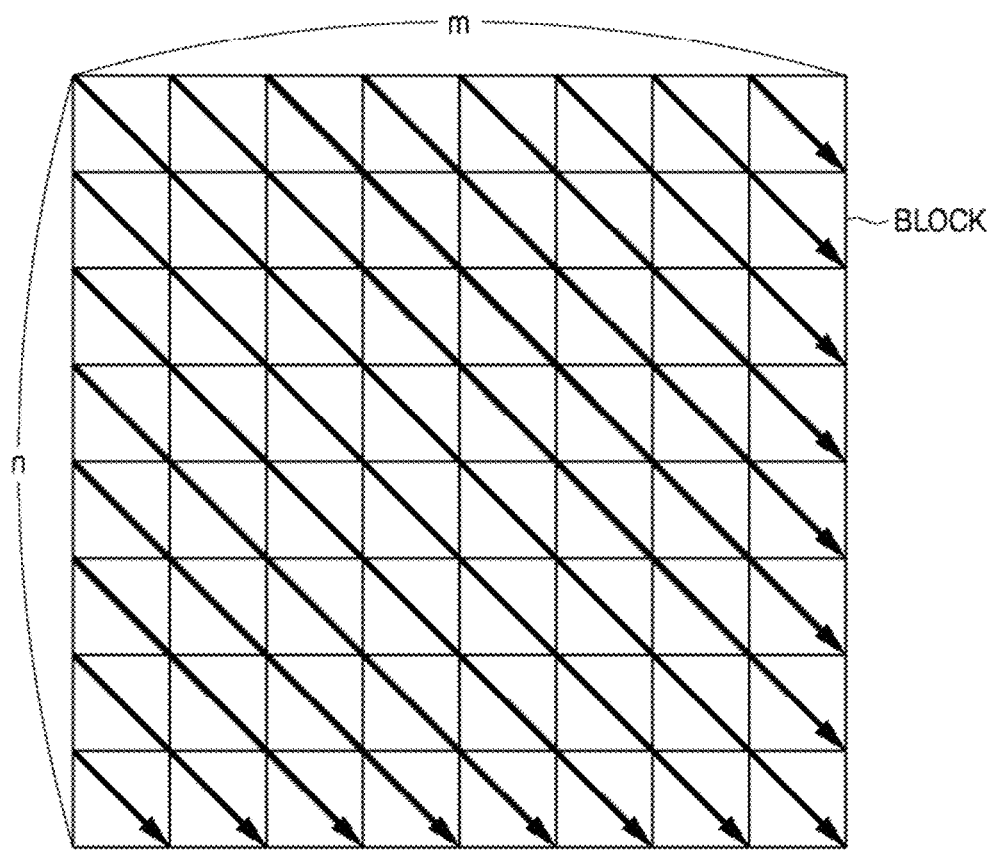

In FIG. 7, a plurality of pixel pairs may be composed using a plurality of pixels included in each horizontal down-right direction. As explained with reference to FIG. 3, when equation 1 is used with each of the plurality of pixel pairs, a descriptor may be formed. In FIG. 8, a plurality of pixel pairs may be composed using a plurality of pixels included in each diagonal down-right direction. As explained with reference to FIG. 3, when equation 1 is used with each of the plurality of pixel pairs, a descriptor may be formed.

Figure 9:
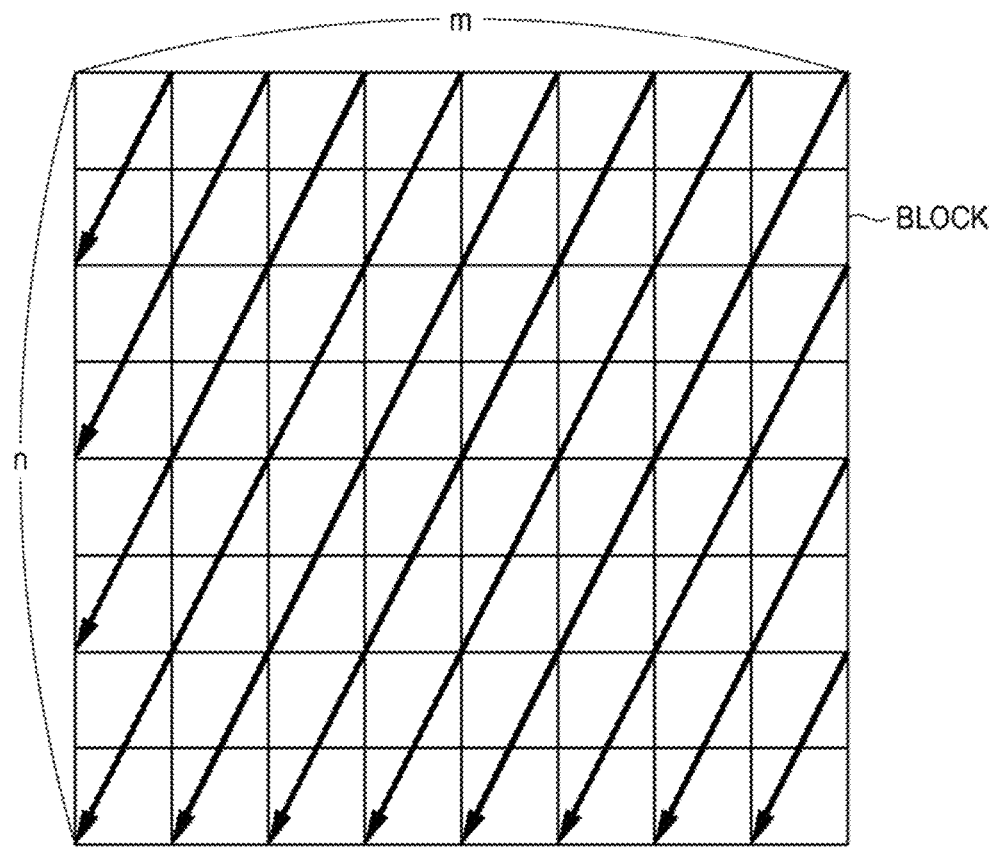
Figure 10:
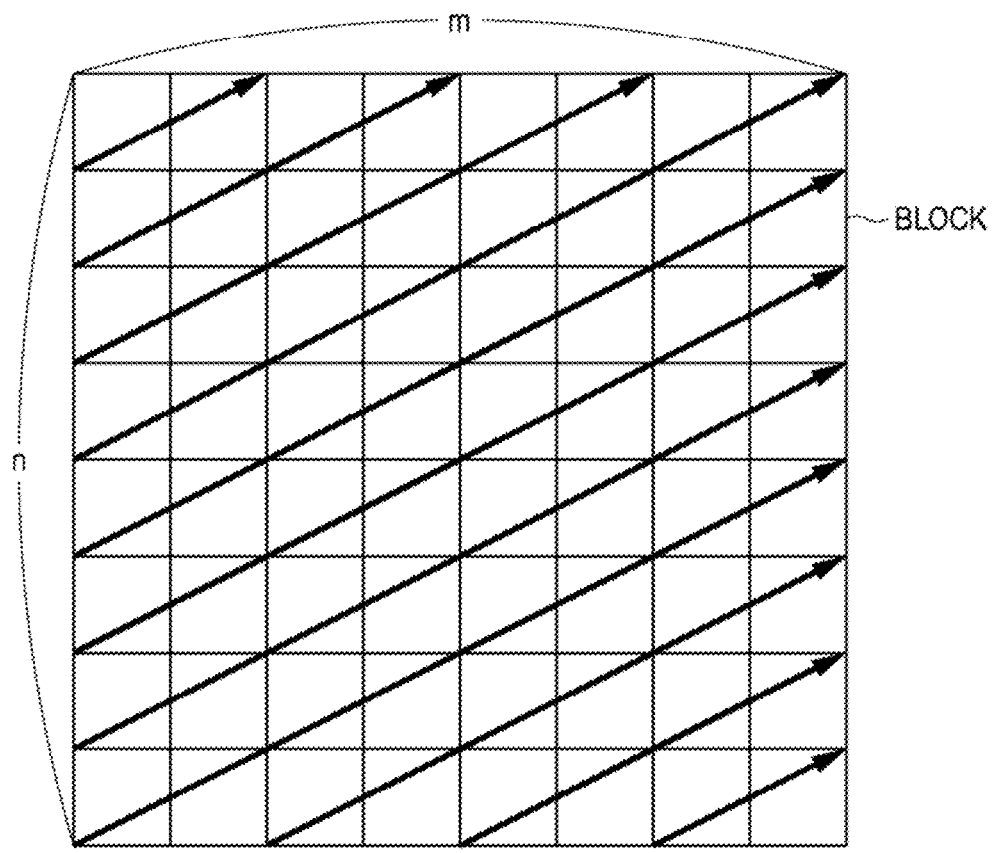

In FIG. 9, a plurality of pixel pairs may be composed using a plurality of pixels included in each vertical left-down direction. As explained with reference to FIG. 3, when equation 1 is used with each of the plurality of pixel pairs, a descriptor may be formed. In FIG. 10, a plurality of pixel pairs may be composed using a plurality of pixels included in each horizontal up-right direction. As explained with reference to FIG. 3, when equation 1 is used with each of the plurality of pixel pairs, a descriptor may be formed.

Figure 11:
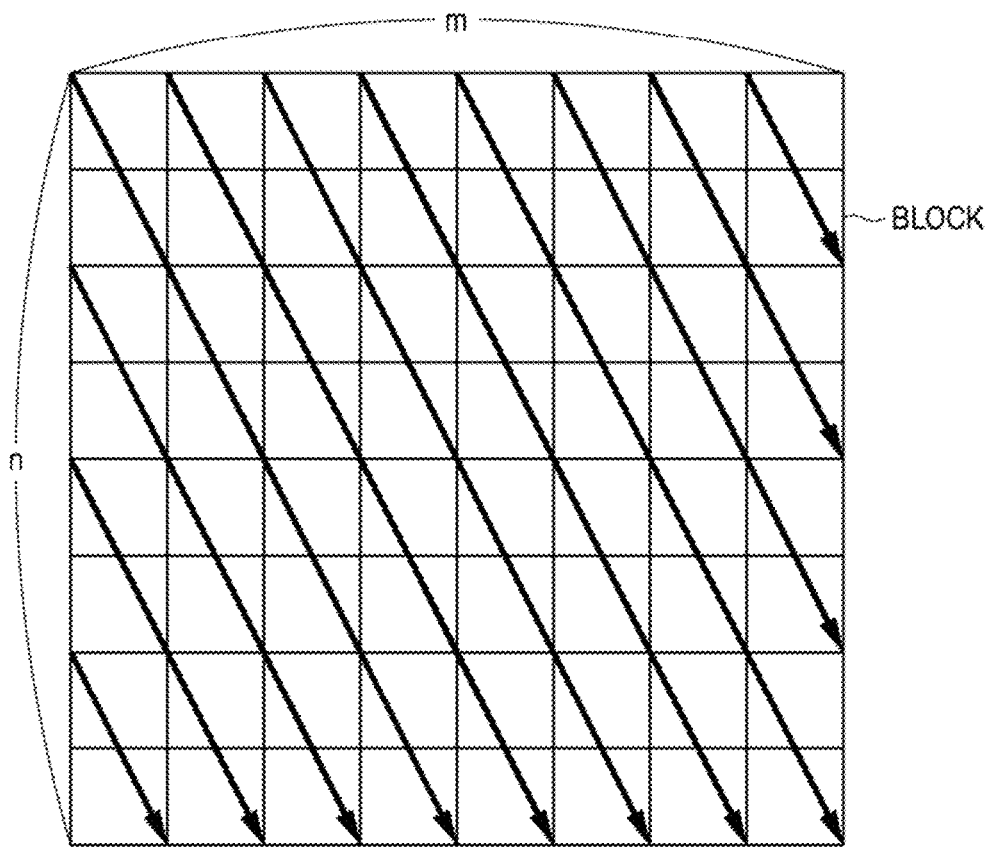

In FIG. 11, a plurality of pixel pairs may be composed using a plurality of pixels included in each vertical down-right direction. As explained with reference to FIG. 3, when equation 1 is used with each of the plurality of pixel pairs, a descriptor may be formed.

Figure 12:
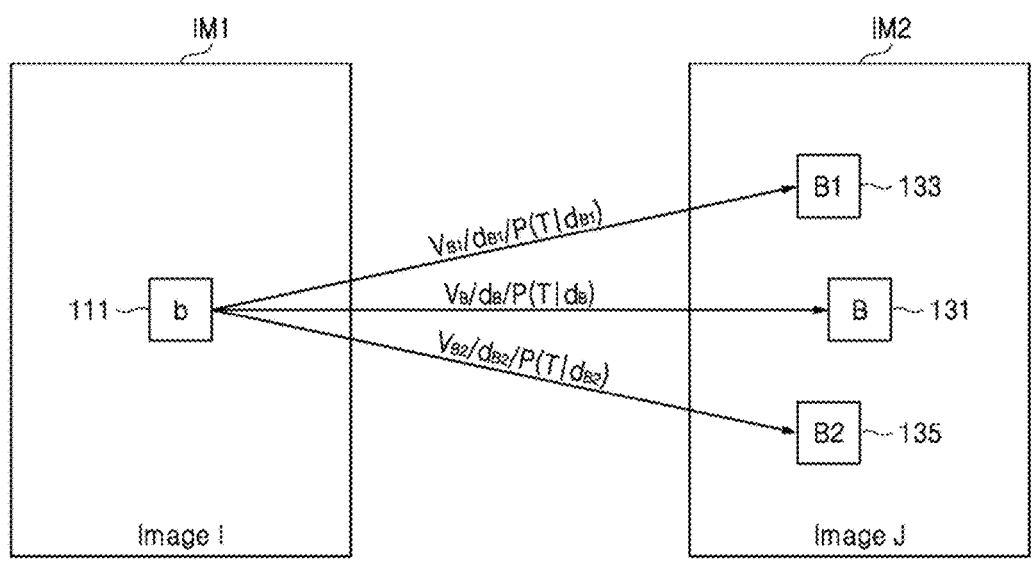
FIG. 12 is a conceptual diagram that illustrates a random displacement vector drawing step according to an exemplary embodiment of the present inventive concepts.
Figure 15:
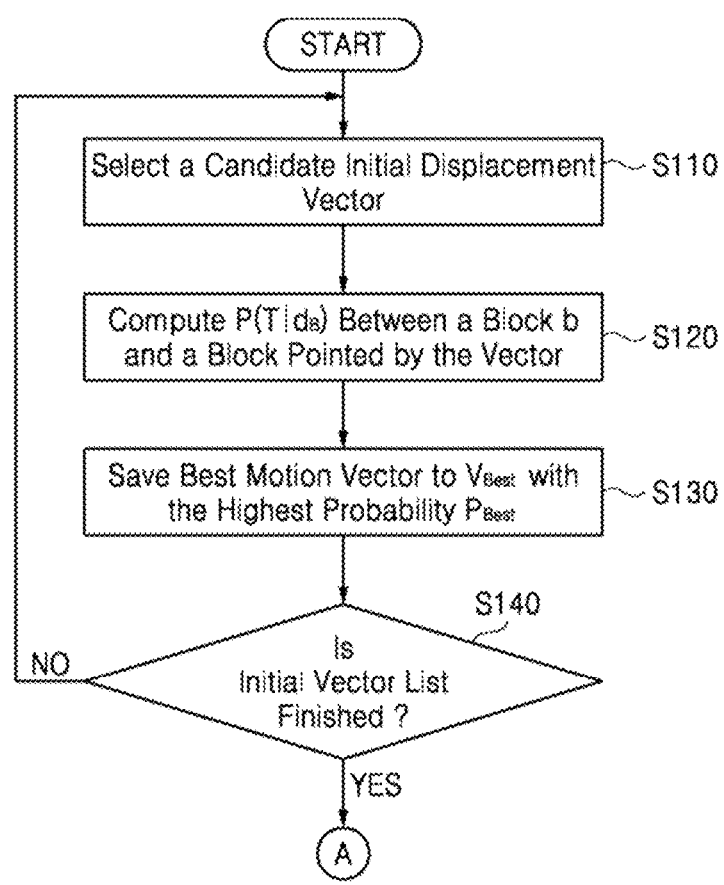
FIG. 15 is a flowchart that illustrates the random displacement vector drawing step illustrated in FIG. 12.

FIG. 12 is a conceptual diagram that illustrates a random displacement vector drawing step according to an exemplary embodiment of the present inventive concepts, and FIG. 15 is a flowchart that illustrates the random displacement vector drawing step illustrated in FIG. 12.

For convenience of explanation, FIG. 12 illustrates a method of searching a plurality of blocks 131, 133 and 135 included in a second image IM2, which is used as a reference image, for a candidate block corresponding to a processing block 111 included in a first image IM1, which is used as a current image, e.g., however, technical concepts of the present disclosure may also be applied to a method of searching a plurality of blocks included in each of a plurality of reference images for a candidate block corresponding to each processing block included in the first image IM1.

First of all, a theoretical background for selecting a motion vector is as follows.

A probability of a candidate displacement vector is estimated for a true match without collision.

Collisions are blocks which have similar representations, e.g., similar descriptors, even though very different in appearance. Displacement vectors representing collisions seem not to be propagated.

As more blocks are tested, the probability of a collision decreases. For example, the probability of many blocks having collisions is comparably lower than that probability of a block having a collision for only one block.

Let i represent a current block, e.g., a processing block, $\vec{v}$ and represent a candidate displacement vector, a displacement vector, or random vector.

Embodiments of the present inventive concept uses a hamming distance determined using two descriptors for two corresponding blocks to calculate a conditional probability. The hamming distance between two strings or descriptors having the same length is defined as the number of positions at which corresponding symbols or bits are different.

Let $T_{\vec{v},i}$ represent a candidate displacement vector $\vec{v}$ for a current block i that is correct, and $T_{\vec{v},i-1}$ represent a candidate displacement vector $\vec{v}$ for a neighboring block (i−1) of the current block i that is correct.

Let $F_{\vec{v},i}=1-T_{\vec{v},i}$ represent a candidate displacement vector $\vec{v}$ for the current block i that is incorrect or a collision, and $F_{\vec{v},i-1}$ represent a candidate displacement vector $\vec{v}$ for the neighboring block (i−1) that is incorrect or a collision.

In addition, let $d_{\vec{v},i}$ represent a similarity measure, e.g., a hamming distance, between the current block i and a block mapped by the candidate displacement vector $\vec{v}$.

For convenience of explanation, equation 2 expresses symbol definitions.

$$T=T_{\vec{v},i} \quad T'=T_{\vec{v},i-1} \quad F=F_{\vec{v},i} \quad F'=F_{\vec{v},i-1} \quad d=d_{\vec{v},i} \quad d'=d_{\vec{v},i-1} \quad [\text{Equation 2}]$$

Additional subscripts are added to represent the origin of the hamming distance. For example, a subscript R indicates a random candidate or a random step, and a subscript P indicates a propagation source or a propagation step.

At a random step, a probability P(T|dR) is expressed according to Bayes law as shown in equation 3.

$$P(T \mid d_R) = P(T) \frac{P(d_R \mid T)}{P(d_R \mid T)P(T) + P(d_R \mid F)P(F)} \quad [\text{Equation 3}]$$

Here, 'T' indicates a true motion or true match, and the true motion indicates real motion of an object at a scene. 'F' indicates a false motion or false match, and the false motion does not indicate real motion of an object despite having similar descriptors.

False F and true T are complementary events, so that their complementary probability is expressed as shown in equation 4.

$$P(T \mid d_R) = \frac{1}{1 + \frac{P(d_R \mid F)}{P(d_R \mid T)} \frac{1 - P(T)}{P(T)}}. \quad [\text{Equation 4}]$$

At the propagation step, a candidate displacement vector propagated from a neighboring block evaluates a probability of an accurate match.

At the propagation step, a probability P(T|dp, dp') is expressed in equation 5 according to Bayes law.

$$P(T \mid d_p, d'_p) = \frac{1}{1 + \frac{P(d_p, d'_p \mid F)}{P(d_p, d'_p \mid T)} \frac{1 - P(T)}{P(T)}}. \quad [\text{Equation 5}]$$

Suppose that neighboring blocks are uncorrelated; then equation 5 would be expressed as equation 6.

$$P(T \mid d_p, d'_p) = \frac{1}{1 + \frac{P(d_p \mid F)}{P(d_p \mid T)} \frac{P(d'_p \mid F)}{P(d'_p \mid T)} \frac{1 - P(T)}{P(T)}} \quad [\text{Equation 6}]$$

To prevent collision(s), probability P(T|dR) and probability P(T|dp, dp') are compared with each other, and the probability P(T|dR) satisfying equation 7 is selectively stored based on the comparison result.

$$P(T \mid d_R) \overset{?}{<} P(T \mid d_p, d'_p) \quad \text{[Equation 7]}$$

Equation 8 results from rearranging equation 7.

$$\frac{P(d_p \mid T)}{P(d_p \mid F)} \frac{P(d'_p \mid T)}{P(d'_p \mid F)} \overset{?}{>} \frac{P(d_R \mid T)}{P(d_R \mid F)} \quad \text{[Equation 8]}$$

Referring back to FIGS. 12 and 15, a candidate initial displacement vector $V_B$ for the processing block b 111 is selected (S110). For example, a block B 131 may be selected by the candidate initial displacement vector $V_B$.

As explained with reference to FIG. 3, a descriptor for a block b 111 and a descriptor for the block B 131 are computed, and hamming distance $d_B$ is computed using computed descriptors. A probability P(T|$d_B$) for the hamming distance dB is computed (S120) from equations 3 and 4.

A candidate initial displacement vector $V_B$ having probability P(T|$d_B$) is saved as a best motion vector $V_{Best}$ having a highest probability $P_{Best}$ (S130). It is determined whether an initial vector list is finished (S140).

To select the best motion vector $V_{Best}$ having the highest probability $P_{Best}$ from three blocks 131, 133, and 135, as illustrated in FIG. 12, steps S110 to S140 are iterated three times. The number of iterations may be programmed in a register.

After the step S140 is performed, a candidate displacement vector $V_{B1}$ for the processing block b 111 is selected (S110). For example, a block B1 133 may be selected by the candidate displacement vector $V_{B1}$. A descriptor for the processing block b 111 and a descriptor for the block B1 133 are computed, and hamming distance $d_{B1}$ is computed using the computed descriptors. A probability P(T|$d_{B1}$) for the hamming distance $d_{B1}$ is computed (S120).

The saved probability P(T|$d_B$) and the computed probability P(T|$d_{B1}$) are compared with each other and, according to a result of the comparison, a candidate displacement vector having a higher probability is saved as a best motion vector $V_{Best}$ (S130). For example, let candidate initial vector $V_B$ having probability P(T|$d_B$) be saved as the best motion vector $V_{Best}$ as a result of the comparison.

After the step S140 is performed, a candidate displacement vector $V_{B2}$ for the processing block b 111 is selected (S110). For example, a block B2 135 may be selected by the candidate displacement vector $V_{B2}$. A descriptor for the processing block b 111 and a descriptor for the block B2 135 are computed, and hamming distance $d_{B2}$ is computed using the computed descriptors. A probability P(T|$d_{B2}$) for the hamming distance $d_{B2}$ is computed (S120).

The saved probability P(T|$d_B$) and the computed probability P(T|$d_{B2}$) are compared with each other and, according to a result of the comparison, a candidate displacement vector having a higher probability is saved as the best motion vector $V_{Best}$ (S130). For example, let candidate initial vector $V_B$ having probability P(T|$d_B$) be saved as the best motion vector $V_{Best}$ as a result of the comparison. After three iterations are finished (S140), a random displacement vector drawing step is finished.

Figure 13:
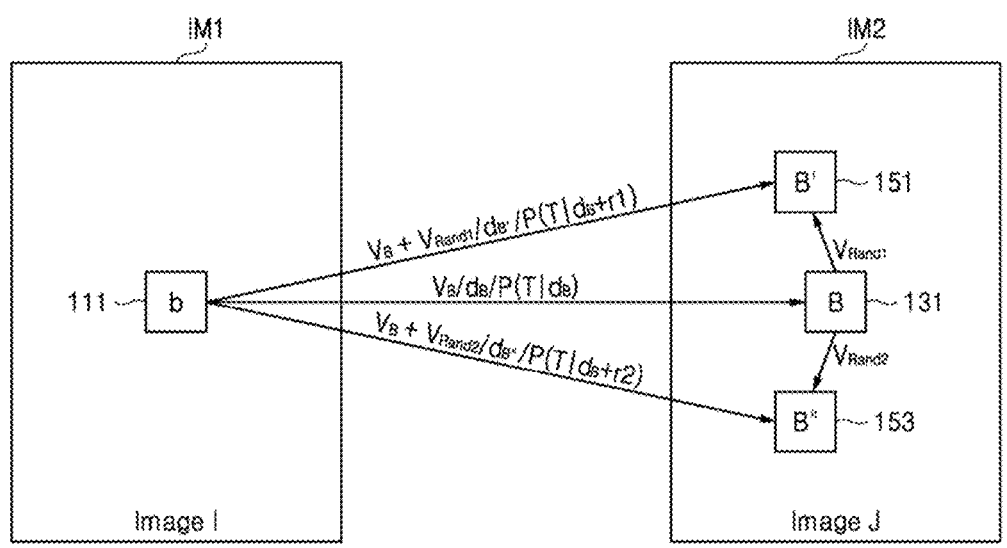
FIG. 13 is a conceptual diagram that illustrates a random step according to an exemplary embodiment of the present inventive concepts.
Figure 16:
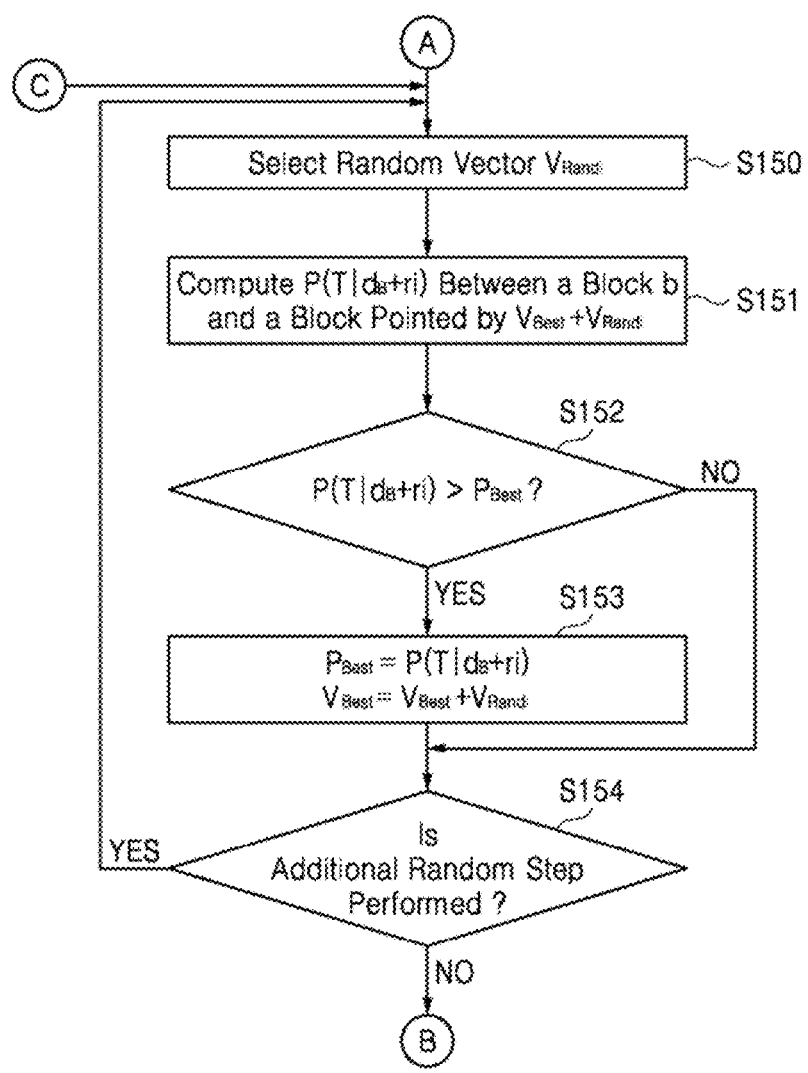
FIG. 16 is a flowchart that illustrates the random step illustrated in FIG. 13.

FIG. 13 is a conceptual diagram that illustrates a random step according to an exemplary embodiment of the present inventive concepts, and FIG. 16 is a flowchart that illustrates the random step illustrated in FIG. 13.

Referring to FIGS. 13 and 16, a random vector is selected based on a block B 131 determined according to a random displacement vector drawing step. An example is illustrated in FIGS. 13 and 16 in which two random vectors are selected. The number of random vectors to be selected may be programmed in a register.

First, a random vector $V_{Randi}$, where i is 1, is selected and accordingly, a random block B' 151 is selected (S150).

Descriptors for the processing block b 111 and for a random block B' 151 are computed based on vectors $V_B$ and $V_{Rand1}$, the hamming distance $d_{B'}$ is computed using the computed descriptors, and a probability P(T|$d_{B+r1}$) is computed for the hamming distance $d_{B'}$ (S151). For example, $V_{Best} = V_B$.

A probability P(T|$d_B$)=$P_{Best}$ selected for a random displacement vector drawing step is compared with probability P(T|$d_{B+r1}$) (S152), and a random vector having a higher probability is saved as the best motion vector $V_{Best}$ based on the result of the comparison (S153).

That is, when probability P(T|$d_{B+r1}$) is greater than probability P(T|$d_B$)=$P_{Best}$, a motion vector $V_{Best+Rand1}$ having the probability P(T|$d_{B+r1}$) is saved as the best motion vector $V_{Best}$ having a highest probability $P_{Best}$ (S153).

When probability P(T|$d_{B+r1}$) is less than or equal to probability P(T|$d_B$)=$P_{Best}$, or after step S153 has completed, it is determined whether to perform an additional random step, i.e., an additional random vector selection process (S154).

Next, a random vector $V_{Randi}$, where i is 2, is selected (S150). Descriptors for the processing block b 111 and a random block B" 153 are computed according to vectors $V_B$ and $V_{Rand2}$, the hamming distance $d_{B''}$ is computed using computed descriptors, and a probability P(T|$d_{B+r2}$) is computed for the hamming distance $d_{B''}$ (S151).

The saved probabilities P(T|$d_B$) and P(T|$d_{B+r1}$) are compared with the computed probability P(T|$d_{B+r2}$) (S152) and, based on a result of the comparison, a random vector having a higher probability is saved as the best motion vector $V_{Best}$ (S153).

That is, when probability P(T|$d_{B+r2}$) is greater than probabilities P(T|$d_B$) and P(T|$d_{B+r1}$), a motion vector $V_{Best+Rand2}$ having probability P(T|$d_{B+r2}$) is saved as the best motion vector $V_{Best}$ having the highest probability $P_{Best}$ (S153).

When probability P(T|$d_{B+r2}$) is less than or equal to probabilities P(T|$d_B$) and P(T|$d_{B+r1}$), or after step S153 has completed, it is determined whether to perform an additional random step, i.e., an additional random vector selection process (S154). In steps S150 to S154, it is assumed that the motion vector $V_B$ having the highest probability P(T|$d_B$) is saved as the best motion vector $V_{Best}$.

Figure 14:
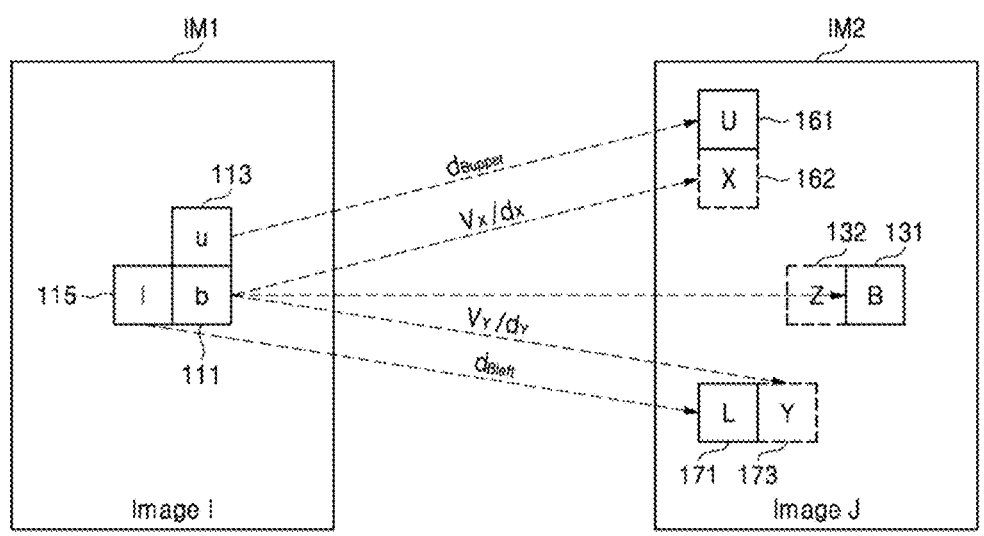
FIG. 14 is a conceptual diagram that illustrates a propagation step according to an exemplary embodiment of the present inventive concepts.
Figure 17:
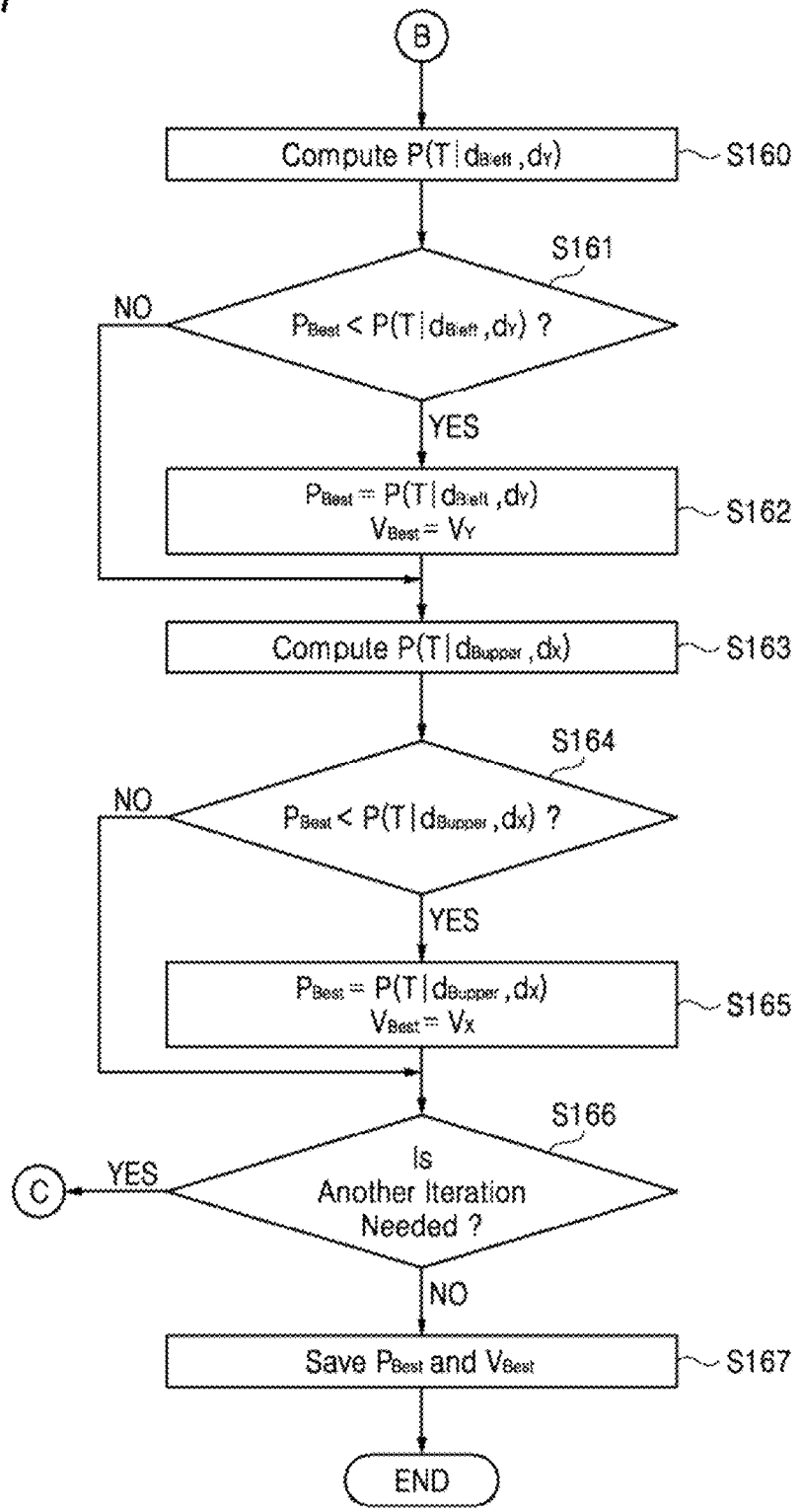
FIG. 17 is a flowchart that illustrates the propagation step illustrated in FIG. 14.

FIG. 14 is a conceptual diagram that illustrates a propagation step according to an exemplary embodiment of the present inventive concepts, and FIG. 17 is a flowchart that illustrates the propagation step illustrated in FIG. 14.

Referring to FIGS. 12 to 17, a matching block U 161 corresponding (or matched) to a block u 113 is selected through steps S110 to S140, and a neighboring block X 162 under the matching block U 161 positionally corresponds to the block b 111.

In addition, a matching block L 171 corresponding to a block 1115 is selected through steps S110 to S140, and a neighboring block Y 173 on a right side of the matching block L 171 positionally corresponds to the block b 111.

Moreover, a matching block B 131 corresponding to a block b 115 is selected through steps S110 to S140, and a neighboring block Z 132 on a left side of the matching block B 131 positionally corresponds to the block I 115.

The hamming distance $d_{Bleft}$ is already computed using the descriptors for blocks 115 and 171. Descriptors are computed for the processing block b 111 and a matching block Y 173, and hamming distance $d_Y$ is computed using the computed descriptors.

As explained with reference to FIGS. 5 and 6, a probabilities $P(T|d_{Bleft}, d_Y)$ are computed for the hamming distances $d_{Bleft}$ and $d_Y$ (S160).

According to an embodiment, if the probability $P(T|d_{Bleft}, d_Y)$ is greater than the probability $P(T|d_Y)$, step S162 is performed, otherwise, step S163 is performed.

If probability $P_{Best}$ is less than probability $P(T|d_{Bleft}, d_Y)$ (S161), a motion $d_X$ is vector $V_Y$ having probability $P(T|d_{Bleft}, d_Y)$ is saved as the best motion vector $V_{Best}$ having the highest probability $P_{Best}$ (S162).

If probability $P_{Best}=P(T|d_B)$ is greater than or equal to probability $P(T|d_{Bleft}, d_Y)$ (S161) or after step S162 has been performed, descriptors are computed for the processing block b 111 and a matching block X 162, and hamming distance $d_X$ is computed using computed descriptors.

As explained with reference to FIGS. 5 and 6, a probabilities $P(T|d_{BUpper}, d_X)$ are computed for hamming distances $d_{BUpper}$ and $d_X$ (S163). The hamming distance $d_{BUpper}$ has already been computed using the descriptors for blocks 113 and 161.

According to an embodiment, if probability $P(T|d_{BUpper}, d_X)$ is greater than probability $P(T|d_X)$, step S165 is performed, otherwise, step S166 is performed.

If probability $P_{Bext}$ is less than probability $P(T|d_{BUpper}, d_X)$ (S164), a motion vector $V_X$ having probability $P(T|d_{BUpper}, d_X)$ is saved as the best motion vector $V_{Best}$ having the highest probability $P_{Best}$ (S165).

If probability $P_{Best}$ is greater than or equal to probability $P(T|d_{BUpper}, d_X)$ (S164) or after step S165 has been performed, it is determined whether an additional iteration is needed (S166).

If an additional iteration is needed, steps S150 to 165 are performed (S166). If an additional iteration is not needed, a best motion vector $V_{Best}$ having the highest probability $P_{Best}$ is saved (S167). A matching block corresponding to the processing block 111 is selected according to step S167.

As described above, one of blocks 131, 162 and 173 may be selected. For example, if probability $P(T|d_{BUpper}, d_X)$ is the greatest, a block X 162 is selected as a matching block of the processing block 111. A block Y 173 is selected as a matching block of the processing block 111 if probability $P(T|d_{Bleft}, d_Y)$ is the greatest, and a block B 131 is selected as a matching block of the processing block 111 if probability $P(T|d_B)$ is the greatest.

Figure 18:
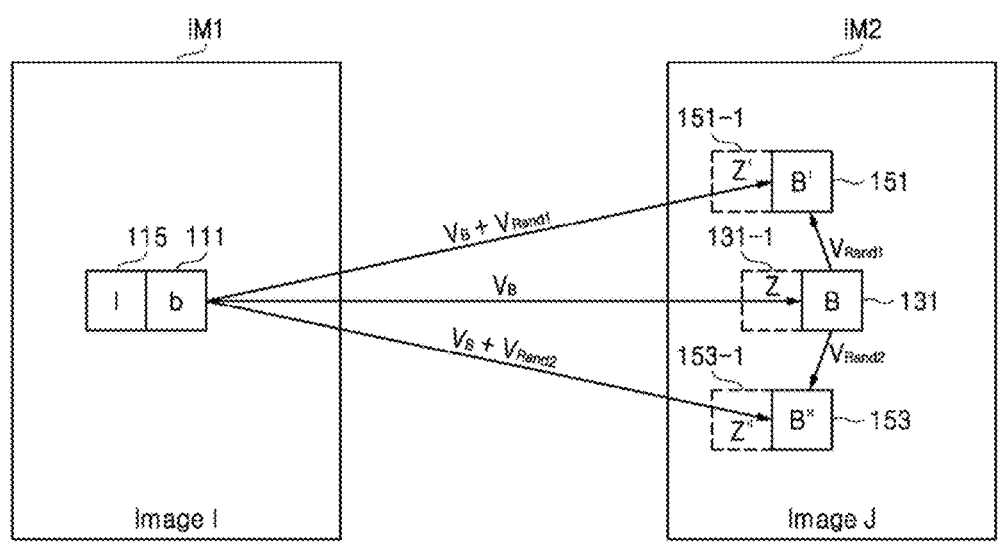
FIG. 18 is a conceptual diagram that illustrates the random step according to another exemplary embodiment of the present inventive concepts.
Figure 19:
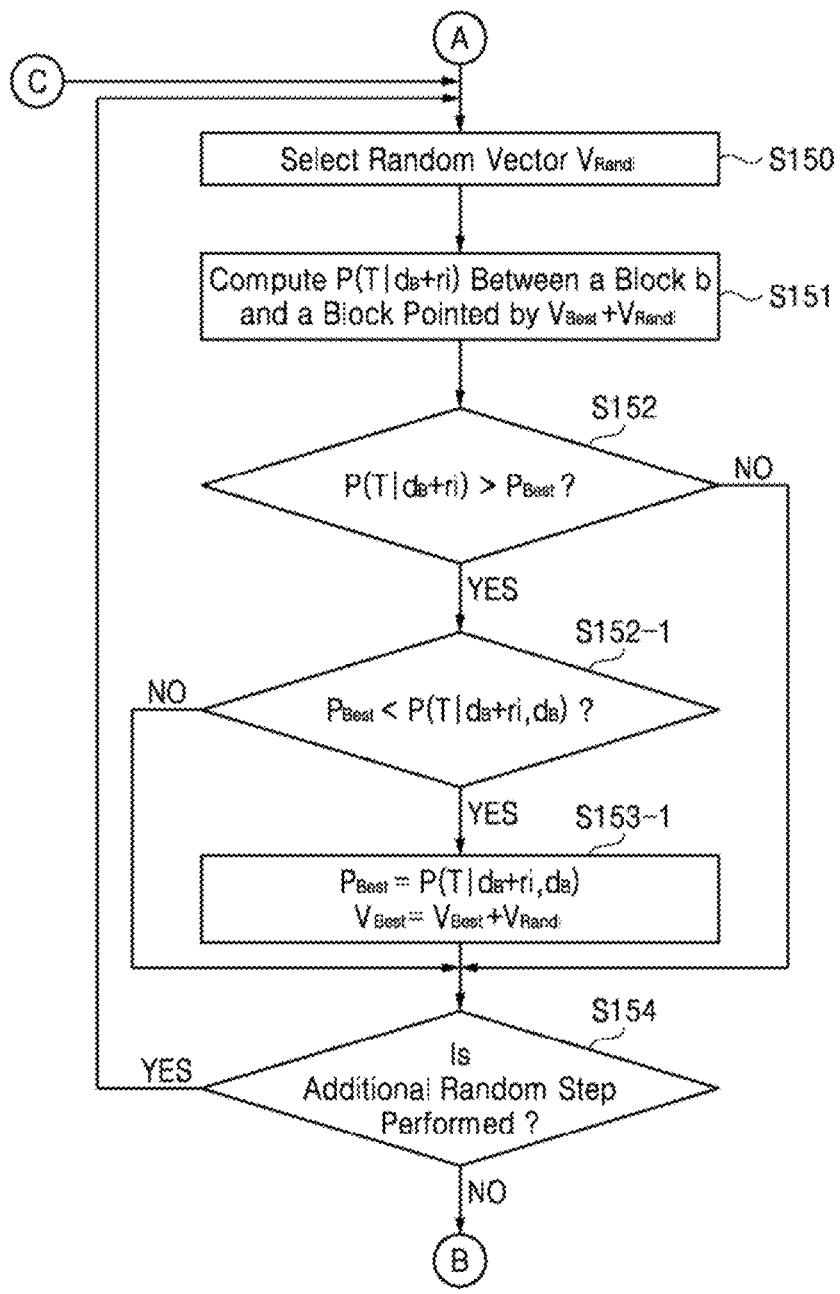
FIG. 19 is a flowchart that illustrates the random step illustrated in FIG. 18.

FIG. 18 is a conceptual diagram that illustrates a random step according to another exemplary embodiment of the present inventive concepts, and FIG. 19 is a flowchart that illustrates the random step illustrated in FIG. 18. Referring to FIGS. 18 and 19, blocks 131-1, 151-1, and 153-1 are respective neighboring blocks of blocks 131, 151, and 153.

First, a random block 151-1 is selected (S150), and probability $P(T|d_{B+r1})$ is computed (S151). If probability $P(T|d_{B+r1})$ is greater than the highest probability $P_{Best}$ (S152), the highest probability $P_{Best}$ is compared with probability $P(T|d_{B+r1}, d_B)$ (S152-1).

If the highest probability $P_{Best}$ is less than probability $P(T|d_{B+r1}, d_B)$, it is determined whether an addition random step needs to be performed (S154). If so, the process is repeated from step S150, otherwise step S160 is performed.

As explained with reference to FIGS. 5 and 6, probability $P(T|d_{B+r1}, d_B)$ is computed for the hamming distances $d_{B+r1}$ and $d_B$ (S160).

If the highest probability $P_{Best}$ is less than or equal probability $P(T|d_{B+r1}, d_B)$, a motion vector having probability $P(T|d_{B+r1}, d_B)$ is saved as a best motion vector $V_{Best}$ having the highest probability $P_{Best}$ (S153-1). A method of processing a random block 151-3 is substantially the same as a method of processing the random block 151-1.

Figure 20:
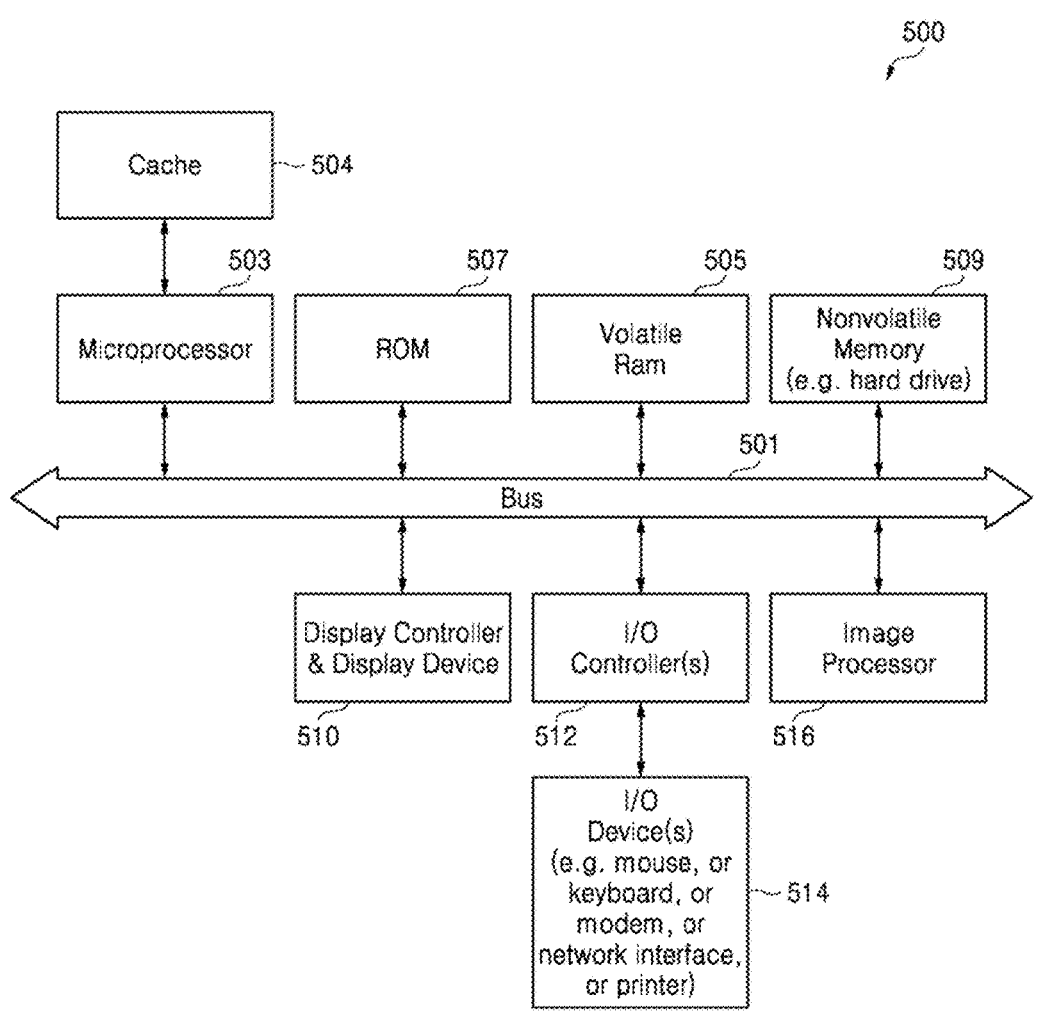
FIG. 20 is a block diagram of an image processing system according to another exemplary embodiment of the present inventive concepts.

FIG. 20 is a block diagram of an image processing system according to another exemplary embodiment of the present inventive concepts. The image processing system 500 includes a microprocessor 503, a cache 504, a volatile memory 505, a read only memory (ROM) 507, a non-volatile memory 509, a display controller/device 510, an input/output controller(s) 512, an input/output device(s) 514, and an image processor (IP) 516.

The microprocessor 503 controls an overall operation of the image processing system 500. For example, the microprocessors 503 may transmit or receive data through the cache 504, and control an operation of each component 505, 507, 509, 510, 512, and 516 through a bus 501.

The volatile memory 505 may be embodied in a random access memory (RAM), and may be used as an operating memory of the microprocessor 503. The ROM 507 may save program(s) and/or data necessary for an operation of the image processing system 500. Program(s) saved in the ROM 507 may be loaded to the volatile memory 505 under control of the microprocessor 503.

The non-volatile memory device 509 may be embodied in a flash memory, a hard disk drive, or a solid state drive (SSD). A display controller of the display controller/device 510 may drive data saved in each memory 504, 505, 507, and 509 to the display device 510 under control of the processor 503.

The input/output controller(s) 512 may interface with the input/output device(s) 514. The input/output device(s) 514 may be embodied in at least one of a mouse, a keyboard, a modem, a network interface, and a printer. The IP 516 can perform a method for selecting a matching block according to an exemplary embodiment of the present inventive concepts. For example, the IP 516 may perform a function identical or similar to the image processing device 300 of FIG. 1.

Figure 21:
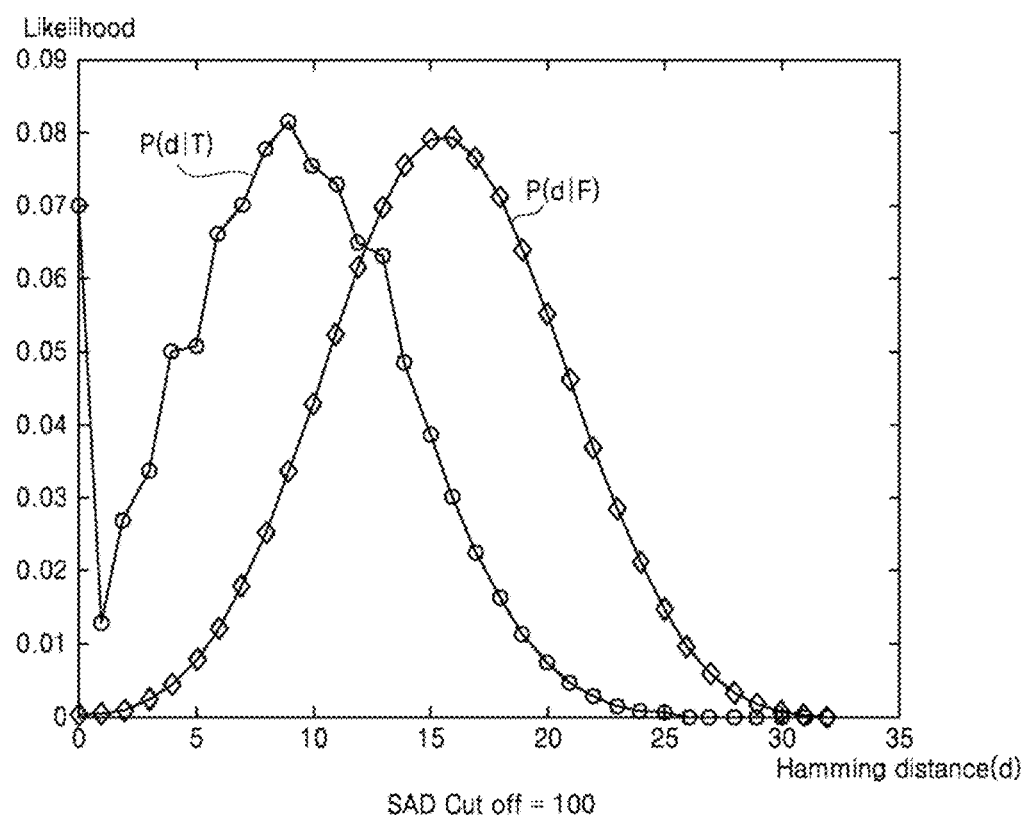
FIG. 21 illustrates an exemplary embodiment of likelihood density for a hamming distance.
Figure 22:
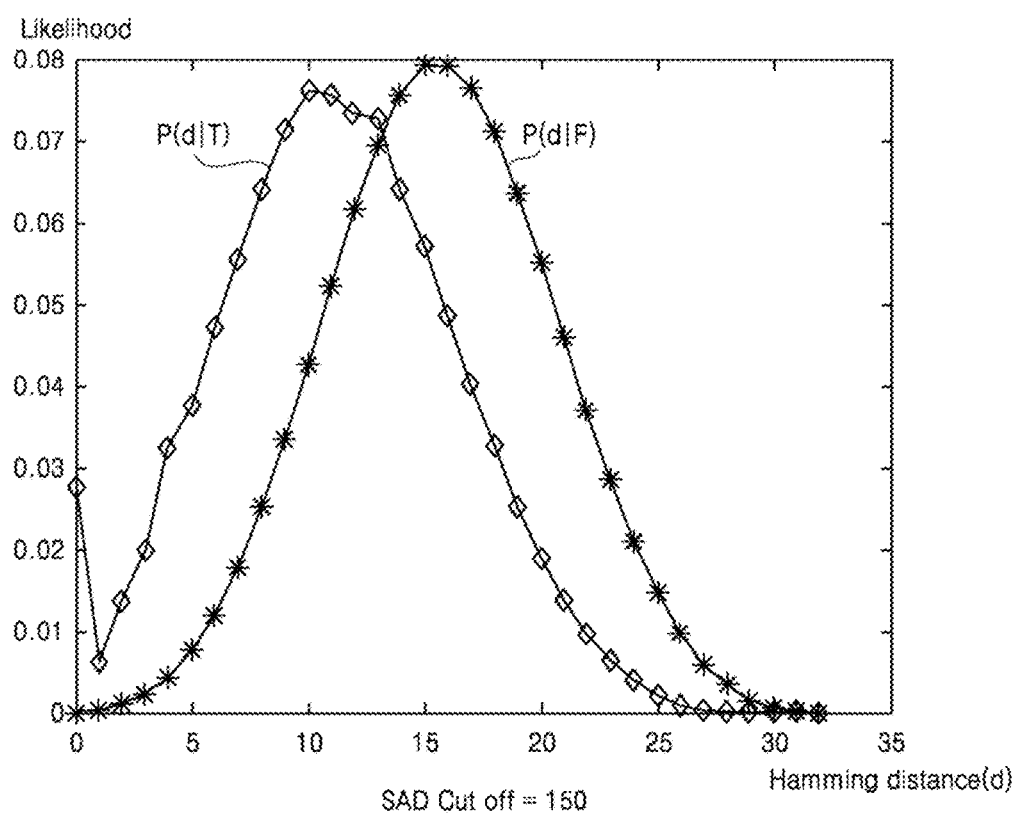
FIG. 22 illustrates another exemplary embodiment of the likelihood density for the hamming distance.

FIG. 21 is an exemplary embodiment of likelihood density of a hamming distance, and FIG. 22 is another exemplary embodiment of the likelihood density of a hamming distance.

FIG. 21 depicts likelihood densities of probability functions P(d|T) and P(d|F) for a hamming distance d when a sum of absolute distances (SAD) cut off is 100. Probability function P(d|T) has a maximum value when the hamming distance d is about 8, and probability function P(d|F) has a maximum value when the hamming distance d is about 16.

FIG. 22 depicts likelihood densities of probability functions P(d|T) and P(d|F) for the hamming distance d when SAD cut off is 150. When the hamming distance d is about 8, probability function P(d|T) has a maximum value, and probability function P(d|F) has a maximum value when the hamming distance d is about 16.

The likelihood densities for the hamming distances illustrated in FIGS. 21 and 22 may be empirically computed, computed based on a result of comparing a pattern of a received image with a feature of a stored image, or set in advance to a predetermined value.

The likelihood densities for the hamming distances may be controlled using a programmable memory, e.g., a register.

A method for selecting a motion vector according to an exemplary embodiment of the present inventive concepts may decrease a frequency of block comparisons, thereby increasing a vision/image processing system performance and bandwidth usage.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A method for determining a motion vector between two images, comprising:
    selecting a candidate block included in a second image that corresponds to a processing block of a first image;
    computing a first probability for the processing block and the candidate block;
    selecting a random block for the candidate block;
    computing a second probability for the processing block and the random block;
    saving a greater of the first probability and the second probability as a first comparison result;
    computing a third probability for the processing block, a first neighboring block of the processing block, a matching block in the second image that is matched to the first neighboring block, and a second neighboring block of the matching block;
    saving a greater of the first comparison result and the third probability as a second comparison result; and
    selecting a motion vector having the second comparison result as a best motion vector.

2. The method of claim 1, further comprising selecting the second neighboring block as the matching block for the processing block when the third probability is greater than the first comparison result.

3. The method of claim 1, wherein the first probability is $P(T|d_1)$ and the second probability is $P(T|d_2)$,
    wherein P represents a probability, T represents a true match, d1 represents a first hamming distance computed using a first descriptor of the processing block and a second descriptor of the candidate block, and d2 represents a second hamming distance computed from the first descriptor and a third descriptor of the random block.

4. The method of claim 3, wherein the third probability is $P(T|d_3, d_4)$,
    wherein d3 represents a third hamming distance computed from a fourth descriptor of the first neighboring block and a fifth descriptor of the matching block, and d4 represents a fourth hamming distance computed from the first descriptor and a sixth descriptor of the second neighboring block.

5. The method of claim 4, wherein each of the first descriptor to the sixth descriptor includes a plurality of bits, and each bit is determined based on a result of comparing a pair of corresponding median pixel values generated as a result of median filtering.

6. The method of claim 1, further comprising:
    selecting a new candidate block;
    computing a new first probability for the processing block and the new candidate block; and
    updating the first probability with a greater of the first probability and the new first probability.

7. The method of claim 1, further comprising:
    selecting a new random block;
    computing a new second probability for the processing block and the new random block; and
    updating the second probability with a greater of the second probability and the new second probability.

8. The method of claim 1, further comprising:
    selecting a new first neighboring block;
    computing a new third probability for the processing block, the new first neighboring block, a new matching block, and a new second neighboring block;
    updating the second comparison result with a greater of the second comparison result and the new third probability; and
    selecting a motion vector having the updated second comparison result as a best motion vector.

9. A method for determining a motion vector between two images, comprising:
    selecting a candidate block included in a second image that corresponds to a processing block of a first image;
    computing a first probability for the processing block and the candidate block;
    selecting a random block for the candidate block;
    computing a second probability for the processing block and the random block;
    saving a greater of the first probability and the second probability as a first comparison result;
    computing a third probability for the processing block, the candidate block, and the random block;
    saving a greater of the first comparison result and the third probability as a second comparison result;
    computing a fourth probability for the processing block, a first neighboring block of the processing block, a matching block in the second image that is matched to the first neighboring block, and a second neighboring block of the matching block;
    saving a greater of the second comparison result and the fourth probability as a third comparison result;
    selecting a motion vector having the third comparison result as a best motion vector.

10. The method of claim 9, further comprising, when the fourth probability is greater than the second comparison result, selecting the second neighboring block as the matching block of the processing block.

11. The method of claim 9, further comprising:
    selecting a new candidate block;
    computing a new first probability for the processing block and the new candidate block; and
    updating the first probability with a greater of the first probability and the new first probability.

12. The method of claim 9, further comprising:
    selecting a first new random block;
    computing a new second probability for the processing block and the first new random block; and
    updating the second probability with a greater of the second probability and the new second probability.

13. The method of claim 9, further comprising:
    selecting a second new random block;
    computing a new third probability for the processing block, the candidate block, and the second new random block; and
    updating the third probability with a greater of the third probability and the new third probability.

14. The method of claim 9, further comprising:
selecting a new first neighboring block;
computing a new fourth probability for the processing block, the new first neighboring block, a new matching block, and a new second neighboring block;
updating the third comparison result with a greater of the third comparison result and the new fourth probability; and
selecting a motion vector having the updated third comparison result as a best motion vector.

15. A method for determining a motion vector between two images, comprising:
selecting a candidate block included in a second image that corresponds to a processing block of a first image;
computing a first probability for the processing block and the candidate block;
selecting a random block for the candidate block;
computing a second probability for the processing block and the random block;
saving a greater of the first probability and the second probability as a first comparison result; and
selecting a motion vector having the first comparison result as a best motion vector,
wherein the first probability is $P(T|d_1)$ and the second probability is $P(T|d_2)$,
wherein P represents a probability, T represents a true match, d1 represents a first hamming distance computed using a first descriptor of the processing block and a second descriptor of the candidate block, and
d2 represents a second hamming distance computed from the first descriptor and a third descriptor of the random block.

16. The method of claim 15, further comprising:
computing a third probability for the processing block, a first neighboring block of the processing block, a matching block in the second image that is matched to the first neighboring block, and a second neighboring block of the matching block;
saving a greater of the first comparison result and the third probability as a second comparison result; and
selecting the second neighboring block as the matching block for the processing block when the third probability is greater than the first comparison result,
wherein the third probability is $P(T|d_3, d_4)$,
wherein d3 represents a third hamming distance computed from a fourth descriptor of the first neighboring block and a fifth descriptor of the matching block, and d4 represents a fourth hamming distance computed from the first descriptor and a sixth descriptor of the second neighboring block.

17. The method of claim 15, further comprising:
selecting a new first neighboring block;
computing a new third probability for the processing block, the new first neighboring block, a new matching block, and a new second neighboring block;
updating the second comparison result with a greater of the second comparison result and the new third probability; and
selecting a motion vector having the updated second comparison result as a best motion vector.

18. The method of claim 15, further comprising:
selecting a new candidate block;
computing a new first probability for the processing block and the new candidate block;
updating the first probability with a greater of the first probability and the new first probability;
selecting a first new random block;
computing a new second probability for the processing block and the first new random block; and
updating the second probability with a greater of the second probability and the new second probability.

19. The method of claim 15, further comprising:
computing a third probability for the processing block, the candidate block, and the random block;
saving a greater of the first comparison result and the third probability as a second comparison result;
computing a fourth probability for the processing block, a first neighboring block of the processing block, a matching block in the second image that is matched to the first neighboring block, and a second neighboring block of the matching block;
saving a greater of the second comparison result and the fourth probability as a third comparison result; and
selecting the second neighboring block as the matching block of the processing block, when the fourth probability is greater than the second comparison result.

20. The method of claim 15, further comprising:
selecting a second new random block;
computing a new third probability for the processing block, the candidate block, and the second new random block;
updating the third probability with a greater of the third probability and the new third probability;
selecting a new first neighboring block;
computing a new fourth probability for the processing block, the new first neighboring block, a new matching block, and a new second neighboring block;
updating the third comparison result with a greater of the third comparison result and the new fourth probability; and
selecting a motion vector having the updated third comparison result as a best motion vector.

\* \* \* \* \*